United States Patent [19]

Kogure

[11] Patent Number: 5,166,920
[45] Date of Patent: Nov. 24, 1992

[54] DISK CLAMP APPARATUS

[75] Inventor: Toshiharu Kogure, Narashino, Japan

[73] Assignee: Seiko Seiki Kabushiki Kaisha, Japan

[21] Appl. No.: 617,633

[22] Filed: Nov. 26, 1990

[30] Foreign Application Priority Data

Dec. 4, 1989 [JP] Japan .............................. 1-140898[U]

[51] Int. Cl.$^5$ ...................... G11B 23/00; G11B 17/02
[52] U.S. Cl. ................................... 369/270; 369/271; 360/99.12
[58] Field of Search ............................... 369/270, 271; 360/99.12, 99.04, 99.05

[56] References Cited

U.S. PATENT DOCUMENTS

| | | | |
|---|---|---|---|
| 4,607,361 | 8/1986 | Schuitmaker et al. | 369/270 X |
| 4,667,258 | 5/1987 | Johnson et al. | 369/270 X |
| 4,736,358 | 4/1988 | Hoshi et al. | 369/270 |
| 4,768,185 | 8/1988 | Camerik | 369/270 |
| 4,797,873 | 1/1989 | Nobutani | 369/270 |
| 5,014,143 | 5/1991 | Mori et al. | 360/99.12 |

FOREIGN PATENT DOCUMENTS

| | | |
|---|---|---|
| 63-46652 | 2/1988 | Japan . |
| 63-103485 | 5/1988 | Japan ............................. 360/99.12 |

OTHER PUBLICATIONS

IBM Technical Disclosure Bulletin, vol. 20, No. 12, May 1978.

Primary Examiner—Stuart S. Levy
Assistant Examiner—Tan Nguyen
Attorney, Agent, or Firm—Bruce L. Adams; Van C. Wilks

[57] ABSTRACT

A clamp mechanism for disks is provided with a clamp body having a reference surface for use in fixing a disk thereon, a plurality of claws adapted to press the disk, which is placed on the reference surface of the clamp body, against the same reference surface and fix the same thereon, a plurality of clamp members which have the claws attached thereto, and which are adapted to be moved vertically in the interior of the clamp body, and cams adapted to turn the clamp members in the radial direction of the disk while the clamp members are vertically moved, in such a manner that the claws come toward one another or go farther away from one another. Each of the claws is formed generally to the shape of a fan. Therefore, the clamp portions of the claws which contact the disk, can press about 70-80% of the total area of the circumferential portion of the central hole in the disk.

6 Claims, 4 Drawing Sheets

DISK CLAMP APPARATUS

BACKGROUND OF THE INVENTION

1. Field of the Invention

This invention relates to a clamp mechanism for disks used, adapted to clamp a disk as a storage medium, for example, a magnetic disk or an optical disk.

2. Description of the Prior Art

The Applicant has already filed an application for a clamp mechanism for disks, which is capable of clamping a disk used as a storage medium, with a uniform level of force at every part of the disk and maintaining the disk-clamping condition safely and reliably even when an accident occurs, and which avoids the possibility of damaging the surface of the disk, such a clamp mechanism is shown in, for example, FIGS. 3-5 (refer to Japanese Patent Laid-open No. 46652/1988).

Referring to FIG. 3, a reference numeral 101 denotes a clamp body, which has at the upper portion thereof a reference surface 101a used to place thereon a disk 102 which is used as a storage medium, such as a magnetic disk or an optical disk, and which is adapted to be rotated unitarily with a rotary shaft 103 by a motor (not shown) and rotate the disk 102. The clamp body 101 is provided therein with three slidable shafts 104, the lower end portions of which are fitted in the recesses in and held firmly by a guide plate 105 positioned in the bottom portion of the clamp body 101. The slidable shafts 104 are provided at their upper ends with claws 106, by which the disk 102 is securely pressed and clamped.

As shown in FIG. 5, each slidable shaft 104 is provided in its circumferential surface with a lead groove 107 inclined at a predetermined angle, and a guide pin 108 engaged with this lead groove 107 is fixed horizontally to the inner surface of the side wall of the clamp body 101. Therefore, owing to the engagement of the lead groove 107 and locking pin 108 with each other, the slidable shaft 104 is turned around the axis thereof as it is vertically moved.

The driving shaft 109 is moved vertically by an operation of a driving unit (not shown) so as to lift or lower the slidable shafts 104 via the guide plate 105, whereby the slidable shafts 104 are moved slidingly in the vertical direction as they are turned horizontally by a cam mechanism consisting of the lead grooves 107 and locking pins 108. During this time, the claws 106 are turned radially outward as shown in FIG. 4, to stably clamp the disk 102 owing to the pressures of compression springs 110 imparted to the claws 106. When the disk 102 is thus clamped, it is turned by rotating the rotary shaft 103 by the motor, and the information written on the disk 102 is read by a magnetic head 112 provided on a carriage 111.

During an operation of taking out this disk 102 from the reference surface 101a, the driving shaft 109 moves up, and the slidable shafts 104 turn around their axes owing to the cam mechanism consisting of the lead grooves 107 and guide pins 108 with the claws turning inward toward one another up to a position shown by two-dot chain line in FIG. 4.

When the slidable shafts 104 are pressed down in such a conventional clamp mechanism for disks, they are moved slidingly in the downward direction as they are turned by the cam mechanisms consisting of the lead grooves 107 and locking pins 108. During this time, the claws 106 are turned radially outward farther away from one another from the position shown by two-dot chain line in FIG. 4, to clamp the circumferential portion of a central hole 102a in the disk 102. Accordingly, it is necessary that the clamp body 101 be provided in its upper end surface with spaces for allowing the claws 106 to be turned therein. Due to these spaces, the dimensions of the claws 106 cannot be increased, and the number of the claws 106 which can be housed in the upper end surface of the clamp body 101 is three at most, i.e., this number cannot be increased, either. The surface area of the parts of the circumferential portion of the central hole 102a in the disk 102 which are thus clamped by the small-sized small number of clamps 106 is around 10% of a total surface area of the same circumferential portion.

A magnetic disk subjected to a magnetic disk inspection apparatus is rotated at a high speed of 3600 r.p.m. In order to reduce the starting time, during which the number of revolutions per minute of the magnetic disk is increased to this level, and the stopping time, during which the number of revolutions per minute thereof is decreased from this level to zero, it is necessary that the magnetic disk be clamped with a large pressing force so as to prevent the magnetic disk from slipping. When the magnetic disk is then clamped with a large pressing force by the claws 106, the clamping surface of which is as small as about 10% of a total surface area of the circumferential portion of the central hole in the magnetic disk as in this conventional example, the magnetic disk would be bent if the surface accuracy of the reference surface 101a of the clamp body 101 is low, and the degree of such bend of the magnetic disk would further increase due to the flexure of the magnetic disk itself. Therefore, when such a bent magnetic disk is measured with a magnetic disk inspection apparatus, the information which is originally written on the magnetic disk, and which is not defective, is detected as an error, i.e., the information written on the disk cannot be read accurately and speedily by a transducer consisting of a magnetic head or an optical head.

SUMMARY OF THE INVENTION

It is an object of the present invention to provide an improved clamp mechanism for disks which has the excellent functions of protecting the disks and the capability of clamping the disks reliably and safely.

The clamp mechanism for disks according to the present invention is provided with a clamp body having a reference surface for use in fixing a disk thereon, a plurality of claws adapted to press the disk, which is placed on the reference surface of the clamp body, against the same reference surface and fix the disk thereon, a plurality of clamp members which have the claws attached thereto, and which are adapted to be moved vertically in the interior of the clamp body, and cam means adapted to turn the clamp members in the radial direction of the disk while the clamp members are vertically moved, in such a manner that the claws come toward one another or go farther away from one another.

According to the inventive clamp mechanism for disks, the clamp members are turned in the radially inward direction of a disk by the cam means when the clamp members are lifted, and, in consequence, the clamp members fall toward the axis of the clamp body. During this time, the claws attached to the clamp members are moved radially inward toward one another.

When the clamp members are pressed down, they are turned in the radially outward direction of the disk by the cam means, i.e., they are moved away from the above-mentioned axis so as to stand up. During this time, the claws attached to the clamp members are turned in the radially outward direction of the disk so as to press the disk against the reference surface of the clamp body, whereby the disk is clamped by the clamp members.

The claws are thus moved as they are in the radial direction of the disk without being turned horizontally as in the conventional clamp mechanism, to incline farther away from one another or toward one another. Accordingly, each claw can be formed to the shape of a fan to increase the area of the disk-clamping portion thereof. Therefore, when these clamp members are turned in the radially outward direction of the disk, the disk can be clamped with the part of the circumferential portion of the central hole therein which occupies about 70–80% of the total area of the same circumferential portion pressed against the reference surface of the clamp body.

DETAILED DESCRIPTION OF THE PREFERRED EMBODIMENT

Figure 1:
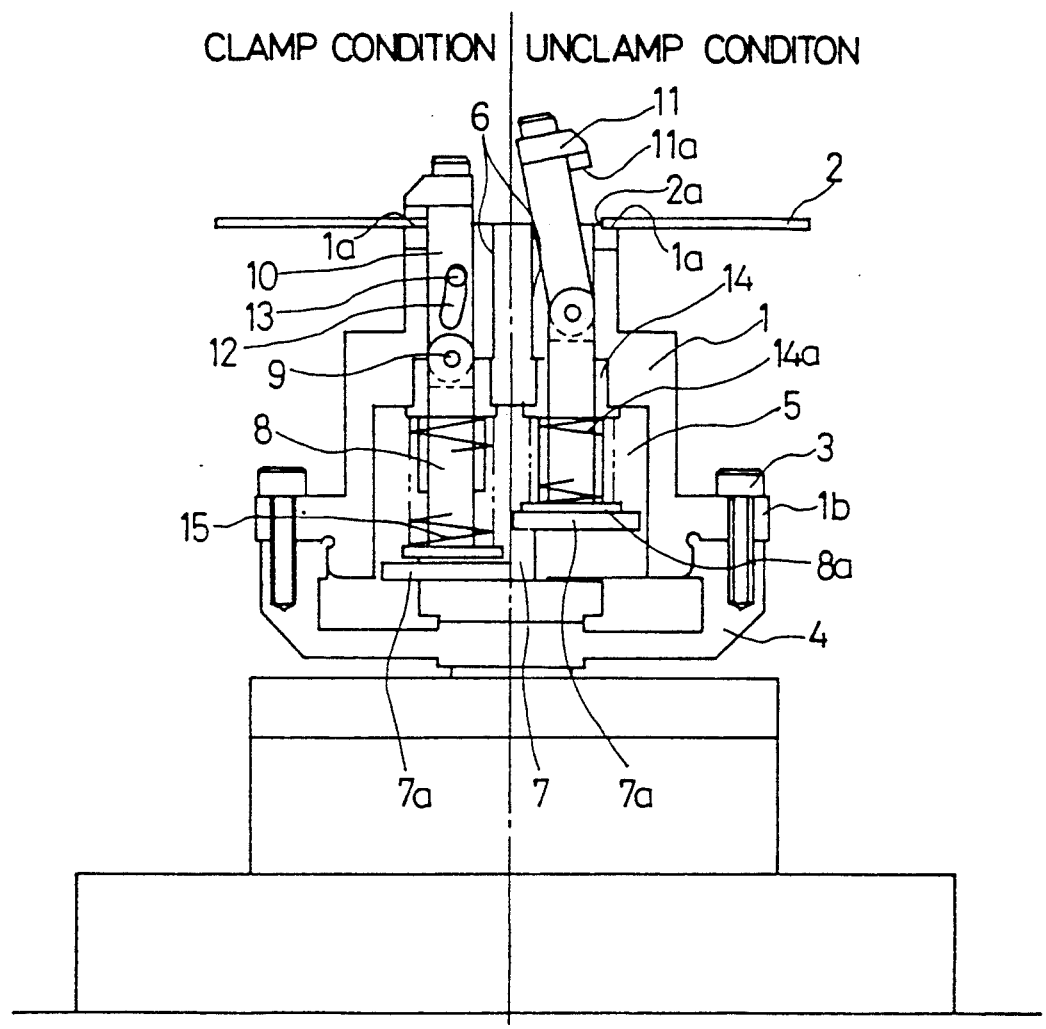
FIG. 1 illustrates a sectional view of an embodiment of the clamp mechanism for disks to the present invention.
Figure 2:
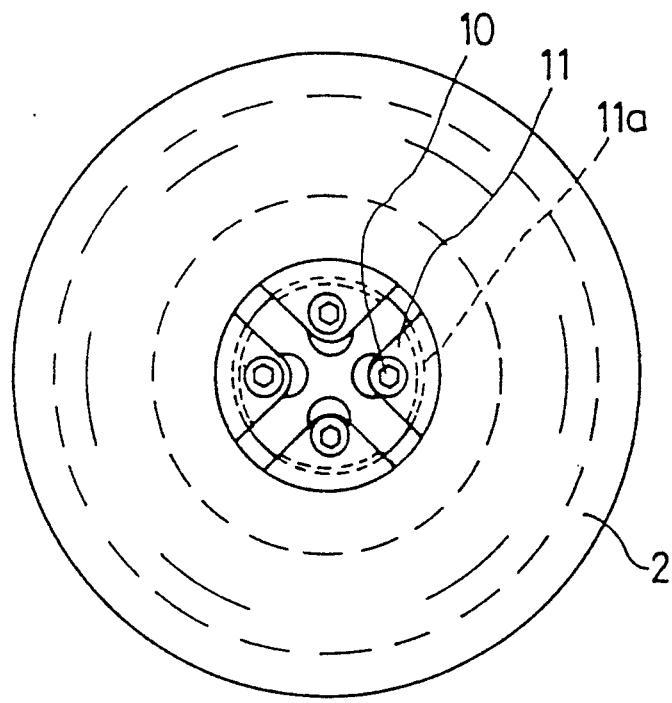
FIG. 2 illustrates a plan view of the embodiment of the mechanism to the present invention.
Figure 3:
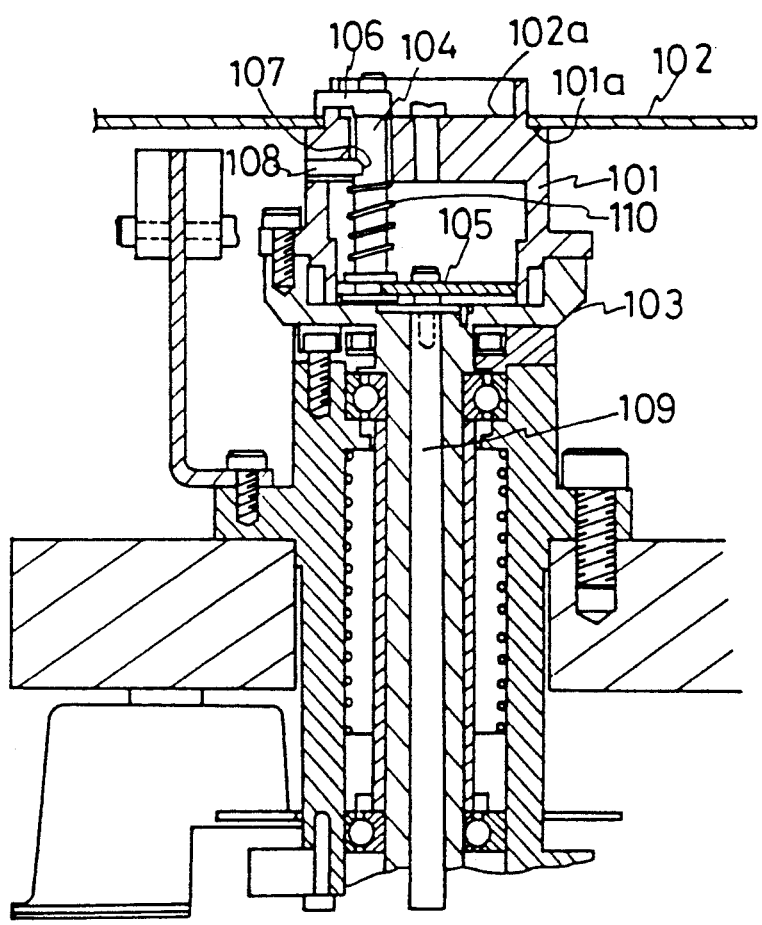
FIG. 3 illustrates a sectional view of a conventional clamp mechanism for disks.
Figure 4:
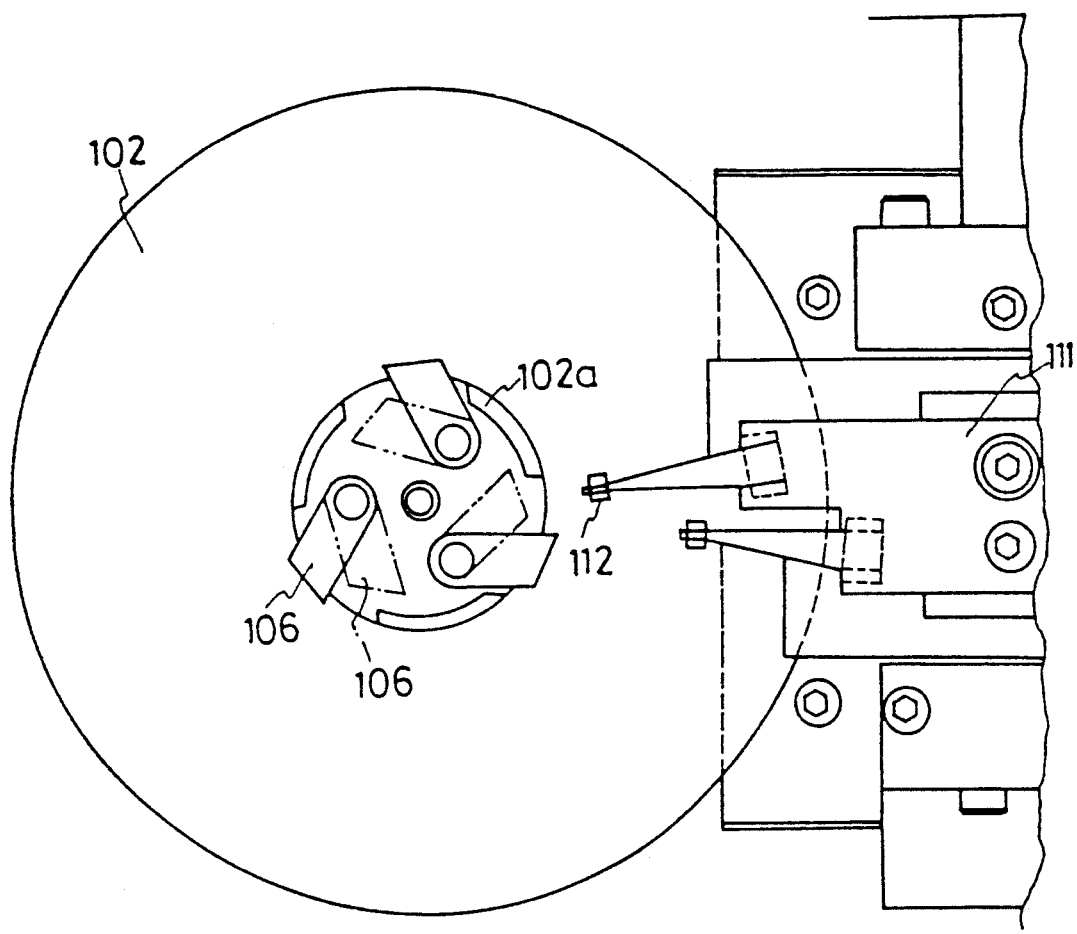
FIG. 4 illustrates a plan view of the conventional clamp mechanism.
Figure 5:
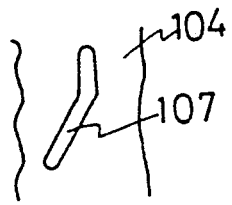
FIG. 5 illustrates a plan view of the conventional clamp mechanism.

The present invention will now be described with reference to the drawings. FIGS. 1 and 2 illustrate an embodiment of the clamp mechanism for disks according to this invention.

First, the construction of the invention will be described.

Referring to FIG. 1, a reference numeral 1 denotes a clamp body which has generally a substantially cylindrical shape, and which is provided at its upper end with a reference surface 1a used to fix under pressure thereto a disk 2 as a storage medium consisting of a magnetic disk or an optical disk, and at its lower end portion with a flange 1b formed integrally with the clamp body. The flange 1b is joined unitarily to rotary arms 4 with bolts 3, and the rotary arms 4 are turned by a motor (not shown).

The clamp body 1 is provided with a storage chamber 5 in the interior of its lower end portion, and four storage bores 6 communicated with this storage chamber 5 are also provided in the clamp body 1 so as to extend to the upper end surface thereof. A power transmission shaft 7 projects from the lower side of the storage chamber 5 thereinto and passed slidably through the portion of the rotary arms 4 which corresponds to the center of rotation thereof. The power transmission shaft 7 is moved vertically by an operation of a driving unit (not shown), and provided at the upper end portion thereof with a substantially disk type guide plate 7a formed unitarily therewith.

Four independent, vertically extending guide shafts 8 are provided in the portion of the interior of the storage chamber 5 which is above the guide plate 7a, and a part of each of these guide shafts 8 is inserted in the relative storage bore 6. The four vertical guide shafts 8 are provided at the upper end portions thereof with four clamp members 10 angularly spaced and connected thereto via pins 9 and fitted slidably the vertical direction in the storage bores 6. Claws 11 for fixing under pressure the circumferential portion of a central hole 2a in the disk 2, which is placed on the reference surface 1a of the clamp body 1, to the same reference surface 1a are attached to the upper end portions of the clamp members 10. As shown in FIG. 2, each of the claws 11, which are attached to the upper end portions of the four clamp members 10, is formed generally to the shape of a fan. Therefore, the clamp portions 11a, which contact the disk 2, of the four claws 11 can press about 70–80% of the total area of the circumferential portion of the central hole 2a in the disk 2.

Each clamp member 10 is provided in its side wall with a generally arcuate lead bore 12, in which a guide pin 13 implanted in the inner surface of the clamp body 1 is fitted. The lead bore 12 and guide pin 13 as a whole form a cam means.

Substantially cylindrical guide members 14 for guiding the vertical guide shafts 8 in the vertical direction in FIG. 1 are inserted in the lower portions of the storage bores 6, and compression springs 15 are provided between the locking portions 14a formed on the guide members 14 and the locking portions 8a formed in the shape of flanges at the lower end portions of the vertical guide shafts 8. The vertical guide shafts 8 are urged constantly in the downward direction in FIG. 1 by the resilient force of the compression springs 15.

The operation of the embodiment will now be described.

When the power transmission shaft 7 is moved up in FIG. 1 by an operation of a driving unit (not shown), the four vertical guide shafts 8 are moved up by the guide plates 7a against the resilient force of the compression springs 15 as shown in the right half portion of the same drawing. When the vertical guide shafts 8 are lifted, the clamp members 10 are also moved up simultaneously. During this time, the guide pins 13 are moved relatively in the substantially arcuate lead bores 12, so that the clamp members 10 are turned in the radially inward direction of the disk 2 and pressed upward as they are inclined in the storage bores 6 toward the axis of the clamp body 1. During this time, the claws 11 attached to the clamp members 10 are moved toward one another in the radially inward direction of the disk 2. The disk 2 placed on the reference surface 1a is then removed with the claws 11 in this state, and another disk 2 is placed on the reference surface 1a.

When the power transmission shaft 7 is lowered by an operation of the driving unit, the four vertical guide shafts 8 are pressed down in FIG. 1 by the resilient force of the compression springs 15 as shown in the left half portion of the same drawing. When the vertical guide shafts 8 are pressed down, the guide pins 13 are moved relatively in the direction, which is opposite to the above-mentioned direction, in the lead bores 12, so that the clamp members 10 are turned in the radially outward direction of the disk 2 and pressed down in a standing state in the storage bores 6. During this time, the claws 11 attached to the clamp members 10 are turned in the radially outward direction of the disk 2 to press the disk 2 against the reference surface 1a with the resilient force of the compression springs 15, whereby the disk 2 is clamped. The rotary arms 4 are then rotated by the motor to turn the disk 2. The pressing of the clamp portions 11a of the claws 11 against the reference surface 1a may be done by another driving force (for example, the driving force of the above-mentioned driving unit) than the resilient force of the compression springs 15.

Since the four claws 11 are turned as they are in the radial direction of the disk 2 to be moved farther away from one another or toward one another without being turned horizontally as in the previously-described conventional example, each of them can be formed in the shaped of a fan to increase the sizes of its clamp portion 11a. When these claws 11 are moved in the radially outward direction of the disk 2 so as to become farther away from one another, they can press the part of the circumferential portion of the central hole 2a in the disk 2 which occupies about 70-80% of the total area of the same circumferential portion against the reference surface 1a to clamp the disk 2.

A magnetic disk used for a magnetic disk inspection apparatus is clamped with a large pressing force by the claws 11 so as to enable the disk to be rotated at a high speed of 3600 r.p.m. and the starting time during which the number of revolutions per minute of the disk is increased to this level and the stopping time during which the number of revolutions per minute of the disk is decreased from this level to zero is reduced. However, in the above embodiment, the part of the circumferential portion of the central hole 2a in the disk 2 which occupies 70-80% of the total area of the same circumferential portion is clamped, so that the flexure of the disk 2 as a whole, which occurs in the conventional example, does not occur. Accordingly, when such a non-bent disk 2 consists of a magnetic disk, the information written thereon can be read accurately and speedily by a magnetic head of a magnetic disk inspection apparatus.

The clamp mechanism for disks according to this device can be used widely for not only a magnetic disk inspection apparatus but also, for example, an optical disk apparatus.

In this clamp mechanism, the disk 2 is clamped by being pressed with an uniform level of force against the reference surface 1a by utilizing the resilient force of the compression springs 15. Therefore, the clamp mechanism according to this device does not have the possibility of hurting the surface of the disk 2 as compared with a conventional clamp mechanism consisting of a collet chuck. The clamp mechanism in this application has not only the excellent functions of protecting the disk 2 but also the capability of clamping the disk 2 on the reference surface 1a reliably and safely.

According to the present invention described above, the claws are turned as they are in the radial direction of the disk to be moved farther away from one another or toward one another without being turned horizontally as in the conventional example. Therefore, the area of the clamp portion, which contacts the disk, of each claw can be increased by forming each claw in the shape of a fan. Consequently, if these claws are turned in the radially outward direction of the disk, the part of the circumferential portion of the central hole in the disk which occupies about 70-80% of the total area of the same circumferential portion can be pressed against the reference surface to clamp the disk thereon.

Accordingly, the disk can be rotated at a high speed with the disk clamped reliably with a large pressing force, and the disk starting and stopping time can be reduced. Moreover, the flexure of the clamped disk as a whole does not occur. This enables the information written on this nonbent disk to be read accurately at a high speed by a transducer consisting of a magnetic head or an optical head.

What is claimed is:

1. A disk clamp apparatus comprising:
    a clamp body having a reference surface for use in fixing a disk thereon;
    a plurality of claws having disk-clamping portions adapted to press said disk, which is placed on said reference surface of said clamp body, against said reference surface and fix said disk thereon, each of said claws having a shape of a fan to increase a clamping area of said disk-clamping portions of the disk clamp apparatus;
    a plurality of clamp members having said claws attached thereto, said clamp members being mounted to be moved vertically in an interior of said clamp body and having pivoting portions for swinging said disk-clamping portions in a radial direction of said disk; and
    cam means for turning said clamp members in the radial direction of said disk while said clamp members are vertically moved, in such a manner that said claws come toward one another and go farther away from one another corresponding to the vertical moving direction of said clamp members.

2. A disk clamp apparatus according to claim 1, wherein each of said pivoting portions has a substantially arcuate lead bore disposed thereon, and a pin member slidably engaged with each said lead bore.

3. A disk clamp apparatus for clamping a disk having a central through-hole, the disk clamp apparatus comprising: a clamp body having a reference surface for clamping a disk thereon: disk clamping means for clamping the disk to the reference surface and comprising a plurality of angularly spaced and movably mounted claw members each having a clamping surface; and cam means for moving the claw members in a vertical direction for raising and lowering the claw members relative to the reference surface and operative to position the angularly spaced claw members about a relatively small diameter when the claw members are in a raised position and to position the angularly spaced claw members about a relatively large diameter when the claw members are in a lowered position, the cam means including a plurality of movable shaft members each operable to move and position one of the claw members, each shaft member having a swinging portion for positioning a respective claw member about the relatively small diameter and the relatively large diameter; whereby the central through-hole in the disk passes around the claw members int he raised position to enable the disk to be positioned on the reference surface, and the claw members in the lowered position clamp the disk between the respective clamping surfaces and the reference surface.

4. A disk clamp apparatus according to claim 3; wherein each claw member has a fan shape to effectively increase a clamping area of the clamping surface.

5. A disk clamp apparatus according to claim 3; wherein the cam means includes a plurality of spring members each operable to apply a clamping force to one of the claw members.

6. A disk clamp apparatus according to claim 3; wherein each swinging portion has a substantially arcuate lead bore, and a pin member slidably engaged in the lead bore.

* * * * *